US012435996B2

(12) United States Patent
Birklbauer et al.

(10) Patent No.: US 12,435,996 B2
(45) Date of Patent: Oct. 7, 2025

(54) FIELD CALIBRATION OF AN AUGMENTED REALITY DEVICE

(71) Applicant: Snap Inc., Santa Monica, CA (US)

(72) Inventors: Clemens Birklbauer, Vienna (AT); Georg Halmetschlager-Funek, Vienna (AT); Matthias Kalkgruber, Vienna (AT); Tiago Miguel Pereira Torres, Vienna (AT); Simon Schreiberhuber, Vienna (AT)

(73) Assignee: Snap Inc., Santa Monica, CA (US)

( * ) Notice: Subject to any disclaimer, the term of this patent is extended or adjusted under 35 U.S.C. 154(b) by 140 days.

(21) Appl. No.: 18/477,297

(22) Filed: Sep. 28, 2023

(65) Prior Publication Data
US 2025/0109966 A1 Apr. 3, 2025

(51) Int. Cl.
G01C 25/00 (2006.01)
G01C 21/00 (2006.01)
(Continued)

(52) U.S. Cl.
CPC .......... G01C 25/00 (2013.01); G01C 21/005 (2013.01); G01C 21/1656 (2020.08); G06T 7/80 (2017.01); G06T 7/85 (2017.01); G06T 19/006 (2013.01)

(58) Field of Classification Search
None
See application file for complete search history.

(56) References Cited

U.S. PATENT DOCUMENTS 10,032,275 B1 * 7/2018 Watson ................. B64U 50/19
11,117,591 B2 * 9/2021 Meng ................... G01D 18/006
(Continued)

FOREIGN PATENT DOCUMENTS

EP 3675084 7/2020
WO 2022005717 1/2022

OTHER PUBLICATIONS

Maye et al., "Self-Supervised Calibration for Robotic Systems," IEEE Intelligent Vehicles Symposium, Jun. 2013, pp. 473-480. (Year: 2013).*

(Continued)

*Primary Examiner* — Todd Melton
(74) *Attorney, Agent, or Firm* — Schwegman Lundberg & Woessner, P.A.

(57) ABSTRACT

A method for recalibrating an augmented reality (AR) device includes generating and storing a ground truth map of a real-world environment when the AR device is operating with a high likelihood of having an accurate factory calibration. During operation of the AR device, new map data is generated for the real-world environment. The new map data is compared to the ground truth map to detect potential calibration errors. If calibration errors are detected, a recalibration procedure is executed by determining an optimal path through the real-world environment that allows for observing parameters requiring recalibration. Visual cues are generated to guide a user of the AR device through the optimal path. As the user follows the visual cues, calibration parameters are iteratively adjusted to eliminate detected calibration errors. The recalibration procedure may be presented as an interactive game to improve user engagement, with rewards provided for accurately following guidance.

18 Claims, 8 Drawing Sheets

(51) Int. Cl.
*G01C 21/16* (2006.01)
*G06T 7/80* (2017.01)
*G06T 19/00* (2011.01)

(56) References Cited

U.S. PATENT DOCUMENTS

| | | | |
|---|---|---|---|
| 11,244,649 | B2 | 2/2022 | Chi et al. |
| 11,380,011 | B2 | 7/2022 | Lerman |
| 11,663,739 | B2* | 5/2023 | Dos Santos Mendonca ............... G06F 3/013 348/187 |
| 2017/0161958 | A1* | 6/2017 | Eilat .................... G02B 27/017 |
| 2023/0245345 | A1* | 8/2023 | Peuhkurinen ............. G06T 7/73 382/155 |
| 2024/0062482 | A1* | 2/2024 | Gupta .................. G06T 19/006 |

OTHER PUBLICATIONS

Wang et al., "A Practical Stereo Depth System for Smart Glasses," IEEE/CVF Conference on Computer Vision and Pattern Recognition, Jun. 2023, pp. 21498-21507. (Year: 2023).*

"International Application Serial No. PCT US2024 048233, International Search Report mailed Dec. 20, 2024", 5 pgs.

"International Application Serial No. PCT US2024 048233, Written Opinion mailed Dec. 20, 2024", 8 pgs.

Thomas, Schneider, "Observability-aware Self-Calibration of Visual and Inertial Sensors for Ego-Motion Estimation Estimation", arxiv.org, Cornell University Library, 201 Olin Library Cornell University Ithaca, NY 14853, (Jan. 22, 2019), 15 pgs.

* cited by examiner

FIELD CALIBRATION OF AN AUGMENTED REALITY DEVICE

TECHNICAL FIELD

The present application relates to the field of wearable augmented reality (AR) devices, such as AR glasses. More specifically, the subject matter of the present application relates to a technique for recalibrating an AR device in the field, subsequent to detecting possible degradation of the factory calibration of the AR device.

BACKGROUND

Augmented reality (AR) glasses are a cutting-edge technology capable of overlaying digital information onto a user's real-world view. AR glasses function by utilizing a combination of sensors, cameras, and a micro-display to project digital content, such as images, videos, or data, into the user's field of vision. This digital content is seamlessly integrated with the user's physical environment, creating an immersive user experience. The AR glasses can recognize and respond to user inputs, such as voice commands, gestures, and in some instances, eye movements, allowing for interactive and dynamic digital experiences. The proper calibration of AR glasses is crucial to ensure accurate alignment of digital content with the real world, enhancing the user's perception and interaction with their surroundings. This fusion of the digital and physical worlds provided by AR glasses offers a unique, enhanced reality experience, transforming the way users interact with information and their environment.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Described herein are methods, systems, and computer program products, for executing a recalibration procedure for recalibrating various parameters of a pair of AR glasses, subsequent to detecting the possible degradation of the factory calibration of the AR glasses. In the following description, for purposes of explanation, numerous specific details are set forth to provide a thorough understanding of the various aspects of different embodiments of the present invention. It will be evident, however, to one skilled in the art, that the present invention may be practiced without all of these specific details.

Figures 1A, 1B:
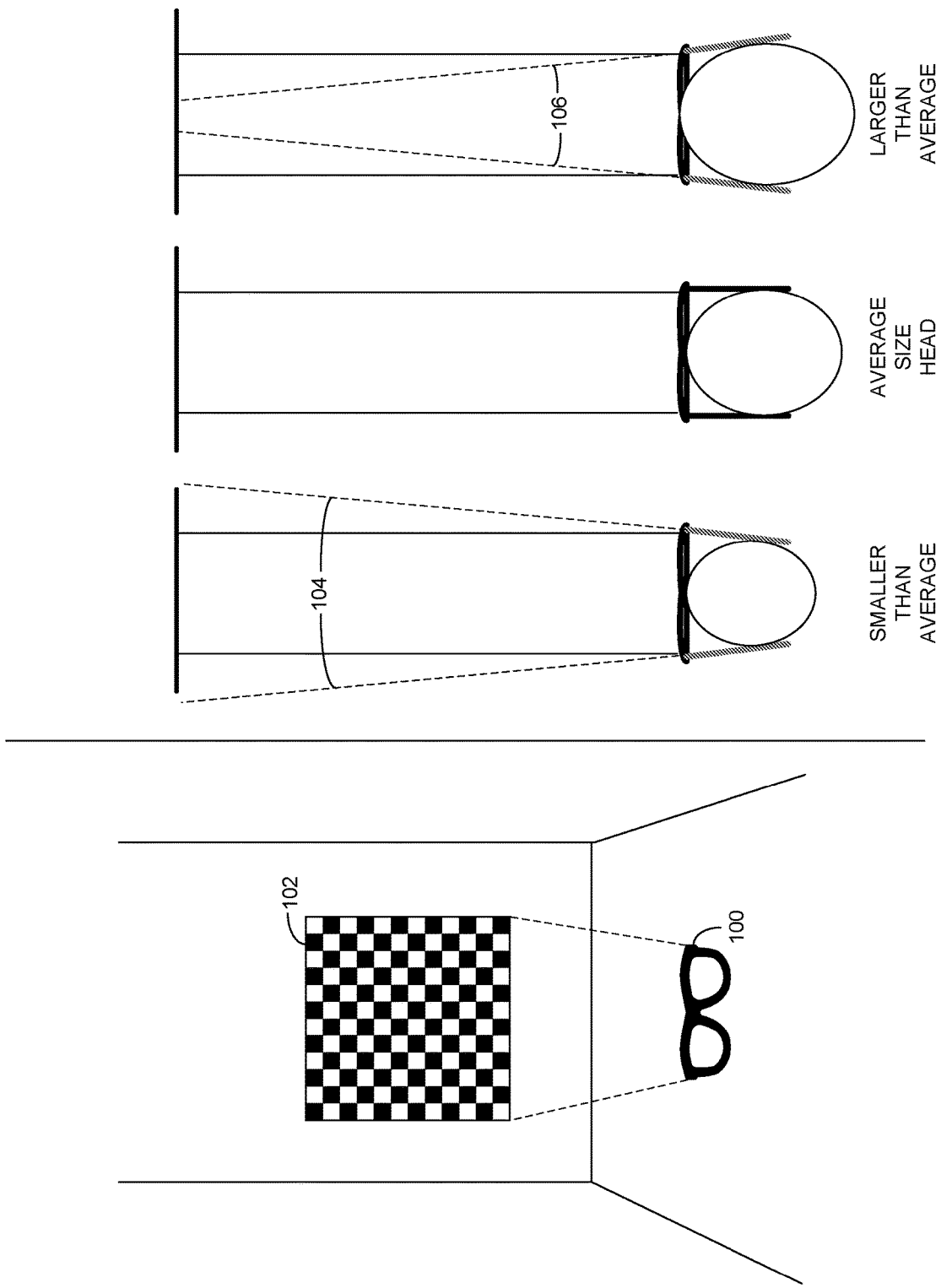
FIG. 1A is a diagram illustrating how a known pattern (e.g., a checkerboard pattern) may be used to calibrate various parameters of stereo vision AR glasses, during a factory calibration operation.
FIG. 1B is a diagram illustrating how the size of a user's head may cause bending of a pair of AR glasses, impacting the orientation of one or both image sensors.

In a factory setting, the calibration of AR glasses 100 is a critical process to ensure the accurate overlay of digital content onto the real-world view. Only correct camera intrinsic, sensor behavior and exact positions of measuring and displaying components, can lead to an accurate and consistent AR experience. One common method employed for the calibration of AR glasses involves the use of a known pattern—referred to generally as a calibration target, such as a checkerboard image 102. Other examples of known patterns that may be used as a calibration target are a dot grid, a circle grid, a symmetrical pattern shape, a color pattern, a barcode, among others. An example of the factory calibration, with known pattern, is illustrated in FIG. 1A. The in-factory calibration process begins with the AR glasses 100 capturing images of the checkerboard pattern 102 through their image sensors (e.g., cameras). These images are then analyzed by a factory calibration algorithm. The checkerboard pattern is particularly useful because its regular, high-contrast squares make it easy for the algorithm to identify specific points (e.g., corners of the squares) in the image.

In the context of calibrating an AR device such as AR glasses, an automated or robotic trajectory may be used to manipulate the AR glasses using a predefined and controlled movement path that a robotic system follows while carrying the AR device. This trajectory is carefully designed to cover various positions and orientations in the environment, allowing the AR device to capture data—for example, via images of the known pattern—from different perspectives. The robot trajectory is used during the calibration process to collect data from known and controlled poses. By moving the AR device through this trajectory, the calibration system can capture sensor data, images, and other measurements that are later used to calibrate and fine-tune the various parameters of the AR device. By knowing the actual dimensions and layout of the checkerboard, as well as its actual distance from the image sensors as the AR glasses traverse the known trajectory, the factory calibration algorithm can compare the captured images with the known image. Based on these comparisons, various parameters can be set with different initial calibration values.

Intrinsic calibration parameters, such as focal length, principal point, and lens distortion, are adjusted based on the differences between the captured and known images. For instance, if straight lines in the checkerboard appear curved in the captured images, the lens distortion parameters are adjusted until the lines appear straight. For extrinsic calibration parameters, such as image sensor position and orientation, the process involves determining how the image sensor(s) need to be positioned and oriented to capture the checkerboard pattern as it appears in the captured image. Because the AR glasses use two image sensors for stereo vision, the stereo baseline (e.g., the distance between the cameras) is also calibrated using the checkerboard pattern. The image sensors capture images of the checkerboard from different angles, and the stereo baseline is adjusted until the perceived depth in the captured images matches the actual depth of the checkerboard.

Once the AR glasses have been calibrated in the factory, there are a variety of factors that may impact the integrity of the initial, factory calibration. For example, if the AR glasses are dropped, bumped, or otherwise subjected to physical shocks, this can cause changes in the alignment or positioning of the image sensors, or other components, which can affect the integrity of the initial calibration. Over time, normal wear and tear of using the glasses can cause changes in the hardware. For example, the lenses might become scratched, the camera mountings might loosen, or the electronic components might degrade. These changes can affect both the intrinsic and extrinsic calibration parameters. Changes in temperature can also cause the materials of the AR glasses to expand or contract, which can affect the integrity of the calibrated parameters. Temperature changes can also affect the performance of the electronic components.

By way of example and as illustrated in FIG. 1B, the size of a user's head may, over time, cause bending or warping of the AR glasses, which could potentially impact both intrinsic and extrinsic parameters. The bending of the AR glasses could shift the position and orientation of the image sensors. This may affect how the image sensors perceive the world, which could lead to inaccuracies in the overlay of digital content onto the real-world view, as illustrated in FIG. 1B with reference numbers 104 and 106. With AR glasses that use two image sensors for stereo vision, the bending of the AR glasses could change the distance between the image sensors (e.g., the stereo baseline). This may negatively impact the ability of the AR glasses to accurately perceive depth, which is crucial for placing digital content at the correct distance in the real-world view. If the bending of the AR glasses causes a shift in the lens or the image sensor, this may move the principal point, which is the point in the image where the optical axis intersects the image plane. This could affect the alignment of the digital content with the real-world view. Finally, the bending of the AR glasses may have an impact on the integrity of the factory calibration of the Inertial Measurement Unit (IMU), leading to inaccuracies in the tracking of movement and orientation by the AR glasses.

Once the integrity of the factory calibration of the AR glasses has been compromised, it is generally desirable to have the AR glasses recalibrated in order to restore accurate and high-quality performance of tracking and content rendering, and so forth. Recalibrating the AR glasses in the same manner as is done in a factory setting presents several challenges. One of the primary issues is the inconvenience and undesirability of sending the AR glasses back to the factory for recalibration. This not only disrupts the user's access to the AR glasses but also incurs additional costs and time delays associated with shipping and handling. Furthermore, factory recalibration may not account for the unique usage conditions and environmental factors that the user experiences in the field, potentially leading to suboptimal calibration results.

Another approach involves letting the user print out a known pattern or calibration target, such as the checkerboard image 102 shown in FIG. 1, and then guiding the user through a calibration process. However, this technique has several drawbacks. First, this method adds friction to the user experience, as it requires the user to actively participate in a technical process that they may not fully understand. Moreover, the quality of the printed calibration target can vary significantly depending on the printer used and the requirement for a perfectly flat surface. These factors can lead to inaccuracies in the recalibration, negatively affecting the performance of the AR glasses.

In yet another approach, an online optimization system may be used to attempt calibrating one or more parameters, on the fly, for example, during runtime of the AR glasses. However, techniques consistent with this approach have many technical challenges. First, these online optimization systems tend to be computationally expensive, which can drain the device's battery and slow down its performance. The quality and observability of the calibration heavily depend on the motion of the user, making it difficult to achieve consistent results. Furthermore, these methods typically do not make use of known patterns or calibration targets, instead relying on objects in a random environment for calibration. This typically requires extensive data collection under ideal conditions, which may not always be feasible in real-world usage scenarios.

Described herein is an improved field-based recalibration technique. Here, the recalibration is referred to as a "field-based" calibration technique to distinguish from the initial factory calibration process. The improved field-based recalibration technique described herein addresses the several technical challenges associated with the aforementioned conventional techniques by capturing and storing a ground truth map associated with a real-world environment when the AR glasses are known to have an accurate and reliable factory calibration—for example, shortly after the AR glasses have been factory calibrated. Then, as the user continues using the AR glasses, the integrity of the factory calibration can be periodically and systematically verified by comparing newly generated map data for a real-world environment with the previously captured ground truth map or maps, for the same real-world environment. Upon detecting a possible degraded state of the factory calibration of the AR glasses, a recalibration operation may be invoked. During the recalibration operation, an optimal path or trajectory is determined, where the optimal trajectory allows for the observation and/or computation of various calibration parameters, specifically by prompting the user to move or follow a particular path and look in various directions. For example, the user may be prompted to traverse a path through the real-world environment by following visual cues (e.g., virtual content) displayed via the display of the AR glasses.

With some examples, the particular trajectory that the user is prompted to follow may be determined based on the specific calibration parameters that are in need of recalibration, as determined based on the nature or type of the calibration error(s) that have been detected. Accordingly, the trajectory may be selected as an optimal trajectory that allows for observing the specific parameters that may need to be recalibrated. The trajectory that the user is prompted to follow will generally allow the AR glasses to capture images of a real-world scene for which the ground truth map exists. Accordingly, the ground truth map can be used as a calibration target or recalibration target. During the recalibration process, the recalibration approach leverages the prior recorded calibration target—for example, the ground truth map—that was generated using the initial factory calibrated parameters of the AR glasses, thereby ensuring a high-quality recalibration without the need for a physical calibration target or extensive data collection. During the recalibration procedures and as the user is traversing the trajectory as guided by the visual cues, newly observed map data can be compared to the ground truth map data. As discrepancies between the two data sets are determined, one or more calibration parameters can be iteratively adjusted to decrease or eliminate these discrepancies. Other advantages and aspects of the inventive subject matter will be readily apparent from the description of the several figures that follows.

Figure 2:
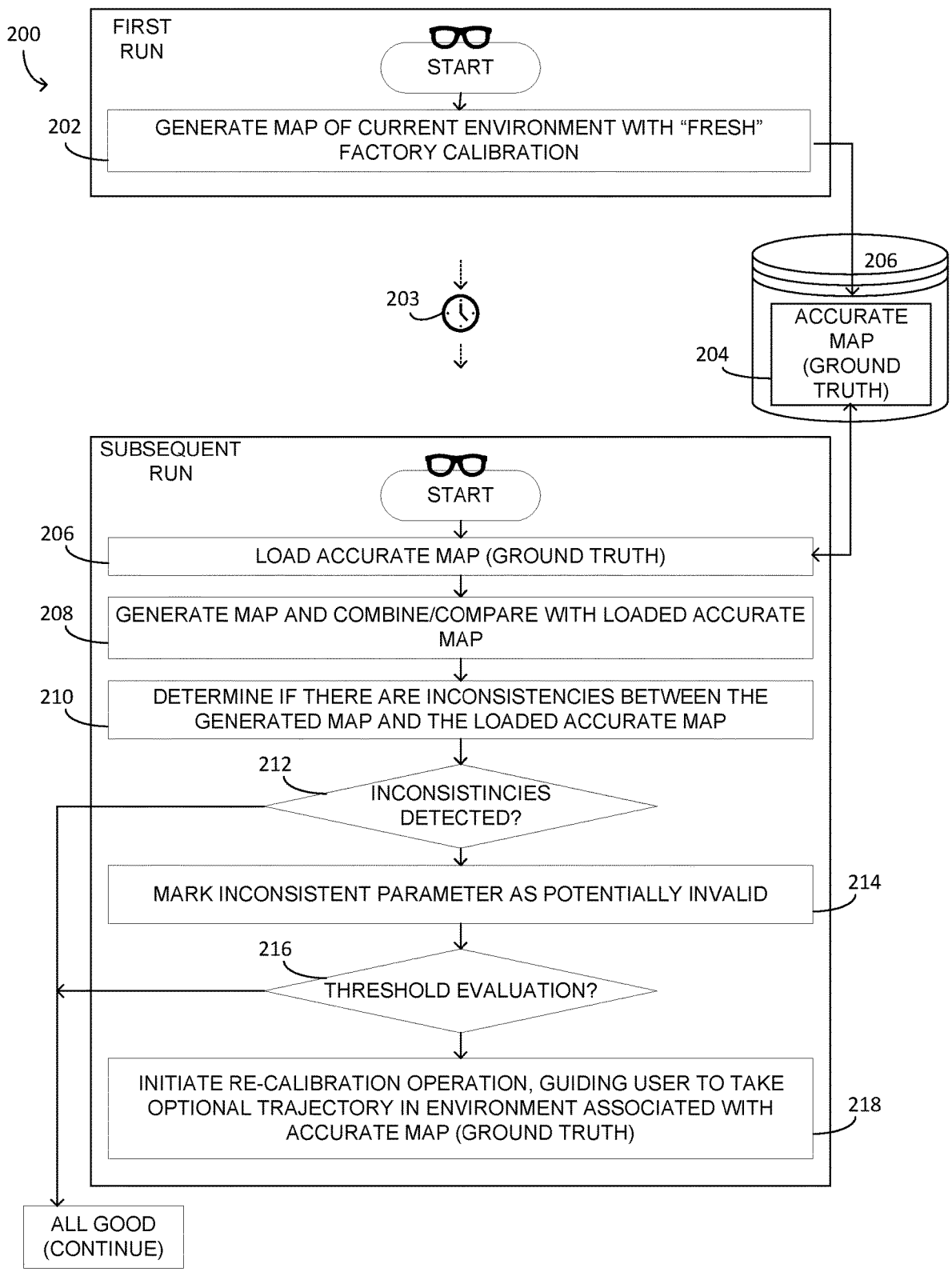
FIG. 2 is a flow diagram illustrating method operations that may be performed by a pair of AR glasses, leading to the invocation of a recalibration operation, according to some embodiments.

FIG. 2 is a flow diagram illustrating method operations for a method 200 that may be performed by a pair of AR glasses, leading to the invocation of a recalibration procedure, according to some embodiments. As shown in FIG. 2, at method operation 202, when the AR glasses are in a state where there is a high likelihood of the AR glasses having an accurate factory calibration (e.g., a "fresh" factory calibration), the AR glasses generate a map of a real-world environment. This map is stored in non-volatile memory 206 of the AR glasses and will serve as a ground truth map 204, to be used in one or more subsequent runs to detect potential degradation of one or more calibration parameters, and in recalibrating the one or more parameters.

Consistent with some examples, the AR glasses are configured to obtain a ground truth map for a real-world environment during a period of time when the AR glasses are presumed to have an accurate factory calibration. Accordingly, during this period of time, a ground truth map may be captured and stored for several different real-world environments, when the user is wearing and operating the AR glasses.

A variety of different techniques may be deployed to determine that the AR glasses are operating in a state for which there is a high likelihood of having an accurate factory calibration. For instance, consistent with one example, the AR glasses can be configured at the factory with a digital flag or configuration setting in their firmware or software that is initially set to indicate the AR glasses are new and factory calibrated, and in some instances, indicating the specific date and time when the initial factory calibration occurred. When the AR glasses are powered on and used by the user for the first time, this flag can be checked, and if verified, a procedure may be triggered to generate and store a ground truth map. The flag may then be toggled or reset, indicating that the glasses have been used and the factory calibration has been initially validated. Alternatively, when the AR glasses are turned on and operated by the user for the very first time, an activation procedure may be executed, and as part of the activation of the AR glasses, a timestamp may be written to memory indicating the date and time when the AR glasses were first activated. Accordingly, when the AR glasses are being used during some period of time starting from when the AR glasses were first activated, or initially calibrated, the AR glasses may perform a background procedure to generate a ground truth map when the AR glasses are being used by the user.

In another example, the AR glasses can be configured with a counter or usage log in their software or firmware that tracks overall usage. This counter could start at zero when the glasses are factory calibrated and new. Each time the AR glasses are powered on and used, the counter is incremented by one, providing a record of how many times the AR glasses have been used. Alternatively, the setting could be a more detailed usage log. This usage log could record not only the number of times the glasses have been used, but also the duration of each use, the date and time of use, and possibly other information such as the types of applications used or the amount of data processed. In both cases, the counter or usage log could be used to determine whether the glasses are presumed to have an accurate factory calibration. For example, if the counter is at zero or the usage log is empty, it might be assumed that the AR glasses are new and have an accurate factory calibration. Once the glasses have been used, the counter or log is updated. At some point, the counter or log data may be compared to a predetermined threshold to determine whether a process should be invoked to capture a ground truth map.

The factory calibration of AR glasses is presumed to be most accurate when the AR glasses are new and have seen minimal use. This is because wear and tear and environmental factors can potentially alter the AR glasses calibration over time. Therefore, a usage log can be used to determine the optimal period of time for capturing the one or more ground truth maps. If the usage log shows that the AR glasses have been used infrequently or for a short period of time, it can be presumed that the factory calibration is still largely intact and accurate. During this period, the device can capture a ground truth map that is likely to be highly accurate, serving as a reliable reference for future observations and recalibrations. If the usage log indicates an amount of use that exceeds a predetermined threshold, the presumption that the factory calibration is intact may no longer hold, and the AR glasses will no longer perform the background operation to obtain and store ground truth maps.

In some instances, the integrity of the AR glasses' factory calibration may be evaluated by detecting extreme acceleration events rather than simply relying on usage duration or activations. The AR glasses could incorporate an inertial measurement unit (IMU) or other dedicated acceleration sensors capable of detecting sudden spikes in acceleration or G-forces. These spikes likely indicate a physical shock or drop event that could disturb the careful factory calibration. As an alternative or addition to an IMU, the AR glasses may include thin, conductive wires incorporated into the frame that are designed to snap or separate in response to any meaningful structural deformation. If the glasses are bent or impacted beyond a certain threshold, these conductive wires will break, acting as a signal that the calibration state may be compromised. By detecting these kinds of extreme acceleration events, drops, or physical deformations, the AR glasses can determine if the AR glasses are operating in a state with a high likelihood of having an accurate factory calibration.

In addition to determining when ground truth map generation should cease, detecting extreme acceleration events can also directly initiate recalibration of the AR glasses. If an acceleration spike, deformation, or severed wire indicates the glasses have been potentially disrupted, this event itself may automatically trigger a recalibration procedure. Rather than waiting to detect mapping inconsistencies, the glasses could recalibrate proactively after experiencing a physical shock that likely impacted calibration accuracy. This acceleration event driven recalibration provides a more responsive and robust mechanism. It ensures recalibration occurs as soon as possible after a disruptive event rather than waiting to accumulate substantial mapping errors. The AR glasses can either recalibrate autonomously using visual cues, or prompt the user to initiate recalibration after a potentially disruptive acceleration event has been experienced.

Figure 3:
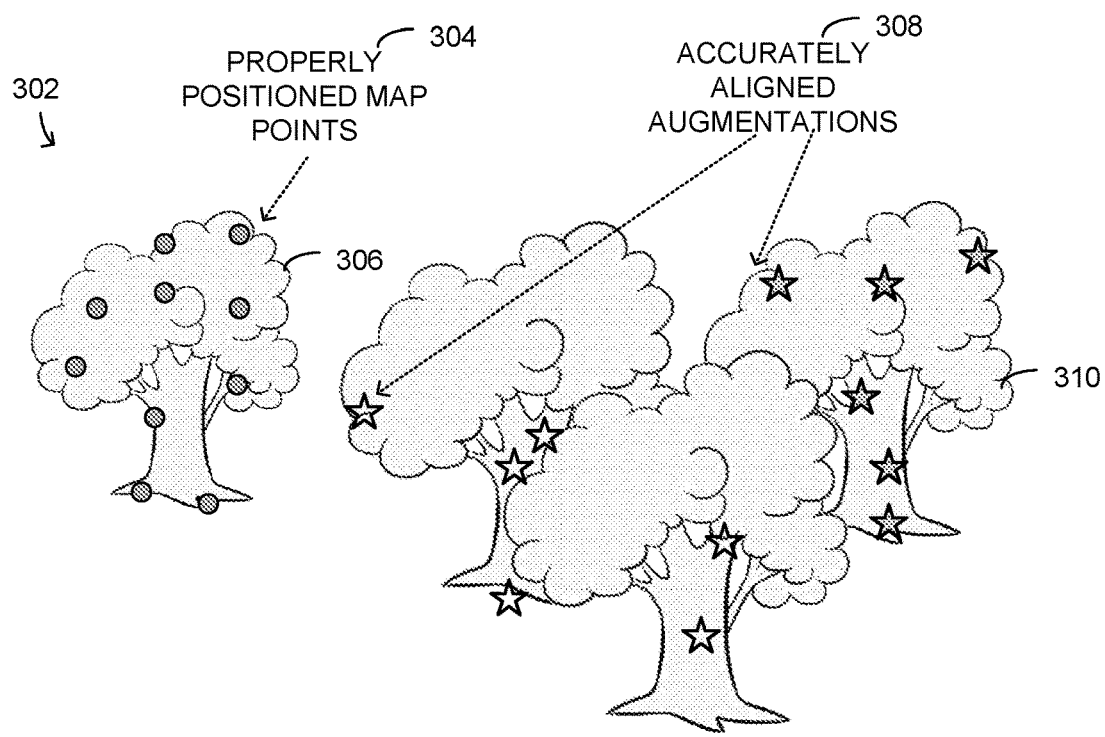
FIG. 3 is a diagram illustrating how a pair of stereo vision AR glasses perform a combination of mapping and localization operations to generate an accurate base map for a particular environment, which will serve as a ground truth map for a subsequent recalibration operation, consistent with some embodiments.
Figure 3:
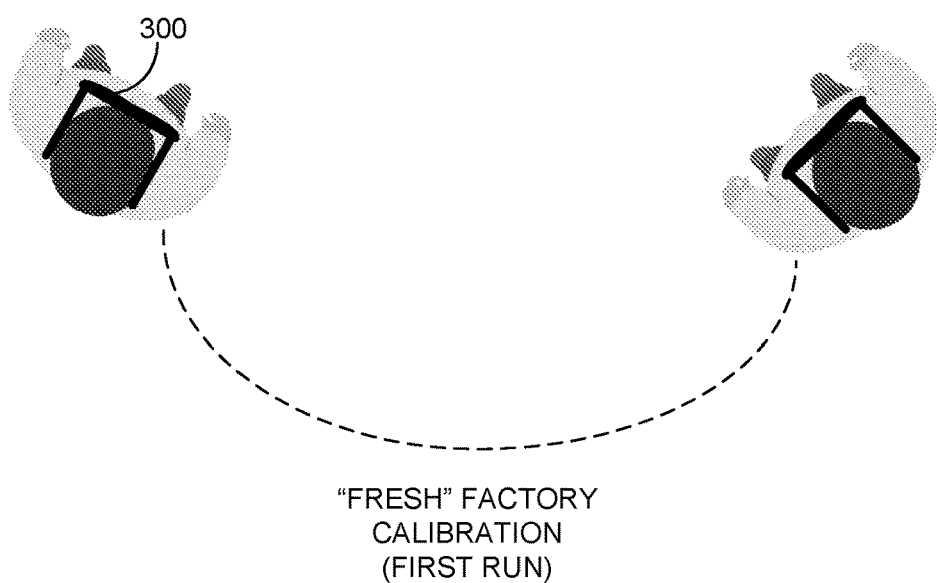

FIG. 3 is a diagram illustrating how a pair of stereo vision AR glasses 200 perform a combination of mapping and localization operations to generate an accurate map for a particular environment, which will serve as a ground truth map for subsequent calibration verification and recalibration operations, consistent with some examples. As a user wears the AR glasses 300 in the new environment 302, the AR glasses 300 will generate a map based on observed images using a process known as Simultaneous Localization and Mapping (SLAM). SLAM is a computational problem of constructing or updating a map of an unknown environment while simultaneously keeping track of the location of the AR glasses 300 within the environment. The process begins with the AR glasses 300 capturing images of the surrounding environment 302 through their image sensors. These images are then processed to identify distinctive features, such as corners, edges, or other unique visual elements of various objects depicted within the images. In FIG. 3, these features or unique visual elements are depicted as map points 304 in the left most tree 306. These map points 304, sometimes referred to as landmarks or visual landmarks, are extracted from the environment and represented in the internal map generated by the AR glasses 300. The map points 304 reflect real-world objects, geometry, markers, and so forth. The relative positions of these map points 304 are used to create a three-dimensional ("3-D") spatial map of the environment 302, as the user moves through and observes the environment 302. Using the spatial map of the environment, the AR glasses 300 can properly align and render virtual content or augmentations 308 (e.g., stars) in relation to the respective objects (e.g., group of trees 310) observed in the images of the real-world environment 302. Accordingly, the proper alignment of the augmentations 308 is generally dependent upon accurately identifying and generating the map points 304.

As the AR glasses 300 move through the environment, they continue to capture images and identify features (e.g., map points 304). The SLAM algorithm uses this new data to update the internal spatial map and determine the current location and orientation of the AR glasses 300 with respect to the map. This process is repeated continuously, allowing the AR glasses 300 to maintain an up-to-date map of the environment and their position within it. This map for a real-world environment, when generated with a "fresh" factory calibration, serves as a ground truth map, via which the AR glasses 300 can subsequently verify the integrity of its factory calibration, and upon detecting calibration errors, perform a recalibration operation. It should also be noted that, with some examples, this ground truth map may be generated using a background process, for example, without the need of the user to explicitly invoke the procedure. Accordingly, the process of generating the ground truth map may occur when the AR glasses are known to be in a factory calibrated state.

Referring again to FIG. 2, after the passage of some time 203 during which the AR glasses have been used, the presumption that the AR glasses have an accurate factory calibration ends. Accordingly, after the user has operated the AR glasses and the AR glasses have generated one or more ground truth maps for one or more real-world environments, during a subsequent run at a location for which a ground truth map has already been generated, the AR glasses may load the accurate ground truth map for the particular real-world environment (e.g., the current location of the user) into its working memory. This is illustrated in FIG. 2 with reference number 206.

The AR glasses can determine their location in a real-world environment using a variety of methods. Consistent with some examples, the AR glasses may include an integrated GPS device for generating location data. In another example, the AR glasses may leverage a wirelessly connected mobile computing device, such as a smartphone, that has built-in GPS capabilities. The AR glasses can connect to the smartphone via Bluetooth or Wi-Fi, and the smartphone can provide the GPS data to the AR glasses. In either case, once the AR glasses have determined their location, they can check their memory or a connected database to see if a ground truth map for that location already exists. If such a map exists, it can be loaded into the working memory of the AR glasses.

At method operation 208, after the accurate ground truth map has been loaded for the real-world environment, the AR glasses perform a map optimization or map update process, during which new map data may be combined and/or compared to the ground truth map 204 for the current real-world environment. For example, at method operation 210, during the map update process, the AR glasses use the ground truth map 204 as a reference to detect or determine possible parameter calibration errors or inconsistencies. The ground truth map 204, which is assumed to be an accurate representation of the current real-world environment, can serve as a benchmark against which the new map data can be compared. When the AR glasses capture new data and generate a new map, it can compare this new map with the ground truth map. If there are significant discrepancies between the new map and the ground truth map, this may indicate a calibration error or inconsistency. Consistent with some examples, the nature of the discrepancy that is detected may also indicate which of several calibration parameters is causing the discrepancy and is therefore in need of being recalibrated.

For example, if the positions of certain features or objects in the new map do not match their positions in the ground truth map, this could suggest a problem with the calibration of the AR device's sensors or cameras. Similarly, if the scale or orientation of the new map does not match the ground truth map, this could indicate a calibration issue. The AR device can use various algorithms and techniques to quantify the discrepancies between the new map and the ground truth map, and to determine the likely sources of these discrepancies. This can involve comparing the features and points of interest in the maps, comparing the geometric properties of the maps, or comparing the sensor data used to generate the maps. An example of misaligned map points is illustrated in FIG. 4.

Figure 4:
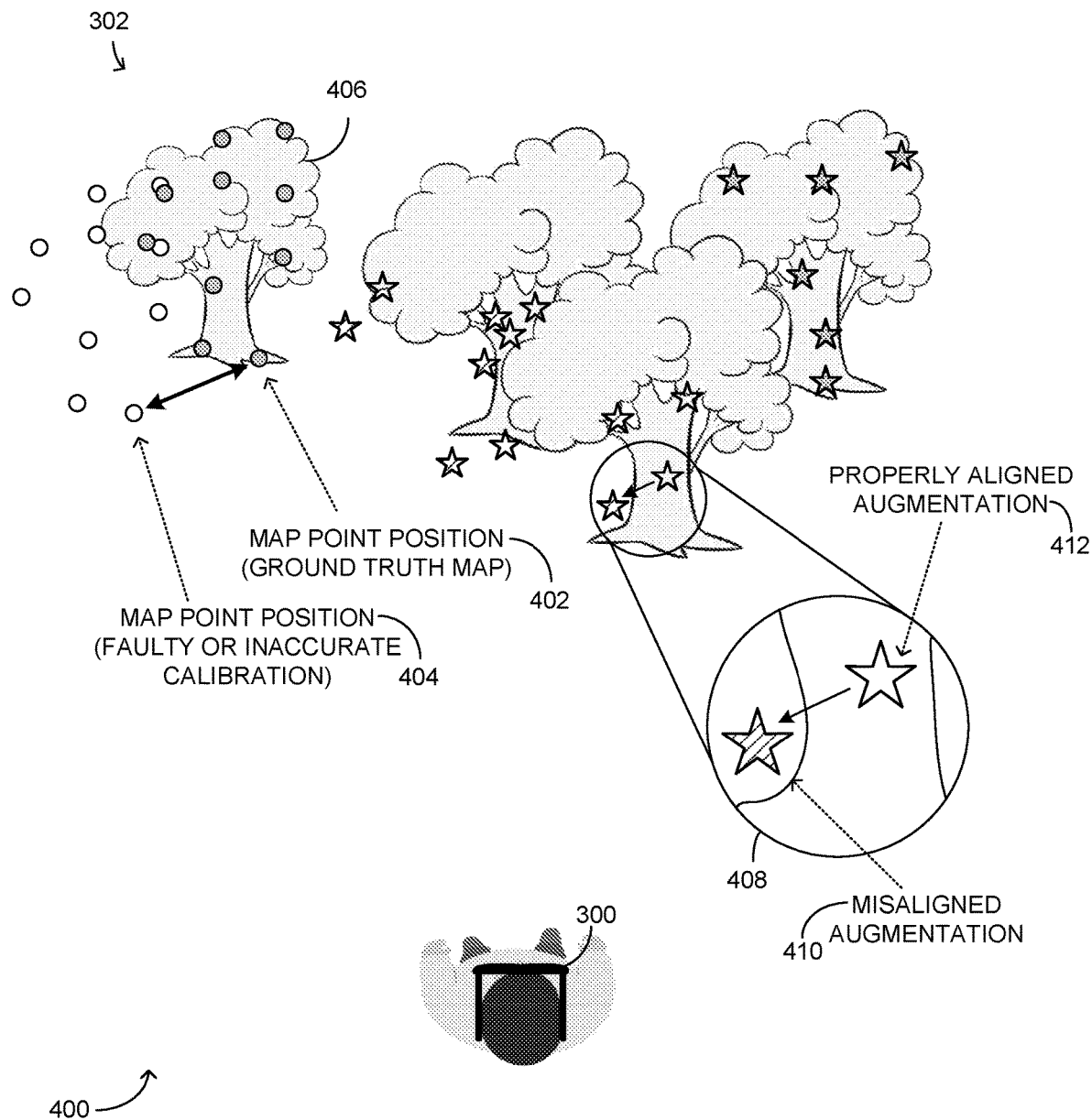
FIG. 4 is a diagram illustrating how a pair of stereo vision AR glasses may detect misalignments and inconsistencies when performing mapping and localization operations in an environment for which an accurate map (e.g., a ground truth map) was previously generated, according to some embodiments.

FIG. 4 illustrates how misaligned map points associated with objects in captured images represent potential calibration errors or discrepancies between a newly generated map and a ground truth map, for a specific real-world environment. As shown in FIG. 4, the AR glasses 300 have captured new images of the surrounding environment 302 (same environment as shown in FIG. 3) and identified features or points of interest, associated with various objects (e.g., tree 406). However, the positions of these features, as represented by the map points in the new map, do not match the positions of the same features in the ground truth map. For example, as illustrated in FIG. 4, the map point with reference number 402 is associated with the ground truth map, whereas the corresponding map point, with reference number 404, is associated with the newly generated map. The discrepancy in the position of these two map points suggests a possible calibration error.

The misalignments between map points indicate that the new map does not accurately represent the geometry and spatial relationships of the real-world environment. This suggests there may be issues with the calibration of the AR glasses 300, impacting how the device perceives and maps its surroundings. For example, the scale, orientation, or alignment of the new map may be incorrect, indicating potential errors in the calibration of sensors or cameras. The discrepancies between the maps can be quantified to estimate the magnitude of these potential calibration errors, which can then be addressed through adjustment of the relevant parameters. By comparing the new map with the ground truth map, calibration issues can be detected and resolved to ensure accurate mapping and localization.

In addition to comparing the new map directly with the ground truth map, calibration errors can also be detected by analyzing the reprojection errors that occur when aligning the ground truth map with the current estimated pose of the AR glasses. As the AR glasses move through the environment, they estimate their new pose using visual odometry or other localization techniques. The ground truth map can then be reprojected onto the current camera images using this estimated pose. If the reprojected map aligns poorly with the actual visual features in the current images, exhibiting large reprojection errors, this indicates the estimated pose is inaccurate and suggests potential calibration errors with the AR glasses' sensors or perception system. By quantifying these reprojection errors and how they change as the user moves, the magnitude of calibration inaccuracies can be estimated and addressed by adjusting the relevant parameters. Analyzing reprojection errors provides another diagnostic tool for detecting calibration drift beyond direct map comparisons.

When a calibration error in the AR glasses' sensors or perception systems is present, the error will introduce inaccuracies into the map points generated from the raw sensor data. For example, a depth calibration error could cause map points to be positioned at incorrect depths compared to their true locations. Or a positional calibration error could shift the entire set of map points from their accurate locations. These inaccuracies in the map point positions will ultimately lead to misalignments when augmentations are rendered using the map points as a reference. For example, if a map point for a particular object is positioned incorrectly, any augmentation attached to or associated with that map point will also be misaligned from the true location of the object. The calibration error(s) introduce inaccuracies into the spatial map (the map points). When these inaccurate map points are then used for rendering augmentations, it leads to virtual content being misaligned from real-world objects and geometry. The calibration error propagates through the mapping process and into the augmentation alignment. An example of this is illustrated in FIG. 4 by the zoomed-in detail circle view 408, showing the misaligned augmentation 410, as compared to the properly aligned augmentation 412.

Referring again to FIG. 2, at method operation 212, if there are no inconsistencies detected between the new map and the ground truth map, the user continues using the AR glasses with the AR glasses taking no further corrective actions. However, once a potential or possible calibration problem is detected, the AR glasses will generally mark the inconsistent calibration parameter as being potentially invalid, as shown by method operation 214. The AR glasses may log detected calibration errors in various ways, such as with a counter or error log, to determine when recalibration is necessary. For example, the AR glasses may maintain a counter that increments each time a possible calibration error is detected. This counter is then compared to a predetermined threshold, such that recalibration is only performed after the counter exceeds the threshold. The threshold may be a fixed value, such as 2, 3, 4 or 10 possible errors, or it may be a variable value dependent on the usage and environmental conditions.

Rather than a basic counter, the AR glasses may log details about the detected calibration errors in an error log. The error log could record information such as the date and time of detection, the type of error (e.g., scale, orientation, position), the magnitude of the error, and the location, real-world environment, or ground truth map. By analyzing trends in this error log, the system may determine when recalibration is required for specific types of errors or in particular environments. For instance, recalibration may be triggered when a certain number of position errors over a predetermined magnitude have been detected within a specific time period, for example, a one-hour period.

The error log approach allows for more intelligent and customized determination of when recalibration is necessary based on the usage patterns and conditions of an individual user. A combination of a counter and error log may also be used, where minor errors increment a counter but are also logged with details, and recalibration is performed either when the counter exceeds a threshold or when the error log indicates a critical mass of specific types of errors. This hybrid approach balances simplicity and customization.

Referring again to FIG. 2, as indicated by the operation with reference number 216, after each possible calibration error is logged, the AR glasses perform an evaluation to determine whether a threshold condition has been reached, such that a recalibration operation is to be performed. Once the AR glasses have detected calibration errors that meet or exceed a predetermined threshold, a flag may be set in the software or firmware of the device to indicate that recalibration is required. However, recalibration cannot be performed until the AR glasses are in an environment for which an accurate ground truth map exists. Therefore, consistent with some examples, the flag acts as a prompt that recalibration should be initiated the next time the AR glasses are used in such a location. At least in some examples, because a ground truth map is used to detect calibration errors, it may often be the case that the AR glasses are in a location associated with a ground truth map when the threshold condition for performing a recalibration operation is satisfied.

In any case, the recalibration flag might be a binary value (0 or 1) stored in the memory of the AR glasses. When the threshold is met and recalibration is needed, this value is switched from 0 to 1. The AR glasses continually check this flag value, and when it is 1, the system begins monitoring the location of the user. As soon as the location matches an environment for which a ground truth map exists, the recalibration procedure is triggered. Upon completing the recalibration operation, the flag is then reset to 0 to indicate recalibration has been performed.

Alternatively, rather than a binary flag, a more complex data structure could be used to store details about the needed recalibration, such as the types of errors detected or the parameters requiring adjustment. When the AR glasses are used in an appropriate location (e.g., a location for which a ground truth map exists), this data structure is accessed to determine how to approach the recalibration. For instance, if position errors were detected, the recalibration procedure may focus on adjusting the image sensor calibration. Like the binary flag, this data structure is reset once recalibration has been completed. Whether a binary flag or more complex data structure is used, the AR glasses will perform a recalibration at the next opportunity, when in a location associated with an existing ground truth map. The flag acts as a reminder, holding the need for recalibration in memory until the AR glasses are able to act upon it. Once recalibration is complete, the flag is reset for the next time it is needed.

As shown in FIG. 2 with reference number 218, when the AR glasses enter a location or environment that is associated with a ground truth map, the recalibration procedure is initiated. Consistent with some examples, a first step in the recalibration operation involves determining an optimal path or trajectory through the real-world environment that will allow for observation of the parameters requiring recalibration. In some examples, this path is calculated based on the details of the detected calibration errors stored in the data structure of the error log. For example, if position errors were detected, the optimal path may pass by highly textured, geometric objects at varying depths and orientations. Similarly, if errors indicate possible calibration issues with the IMU, the calculated trajectory may involve a variety of different changes in orientation, with stops and starts, and so forth.

Once an optimal path or trajectory has been calculated, visual cues are generated to guide the user along this trajectory. These visual cues may include circles, arrows, highlights, or other augmentations that are overlaid on the real-world view and displayed on the AR glasses. The visual cues prompt the user to move in a specific direction, turn their head, or look at a particular object. By following these cues, the user traverses the optimal path, allowing the AR glasses to capture data needed to recalibrate the necessary parameters.

As the user moves through the environment, the AR glasses track the location and orientation of the glasses using the ground truth map as a reference. New data, such as images and depth measurements, are captured and compared to the ground truth map. Discrepancies between the data and the map are used to adjust the calibration parameters, with the goal of eliminating or reducing the detected errors. After following the visual cues for the optimal path, the user may be prompted with additional cues for a second pass to validate the recalibration. If the detected errors have been addressed, the flag is reset and normal operation resumes.

Figure 5:
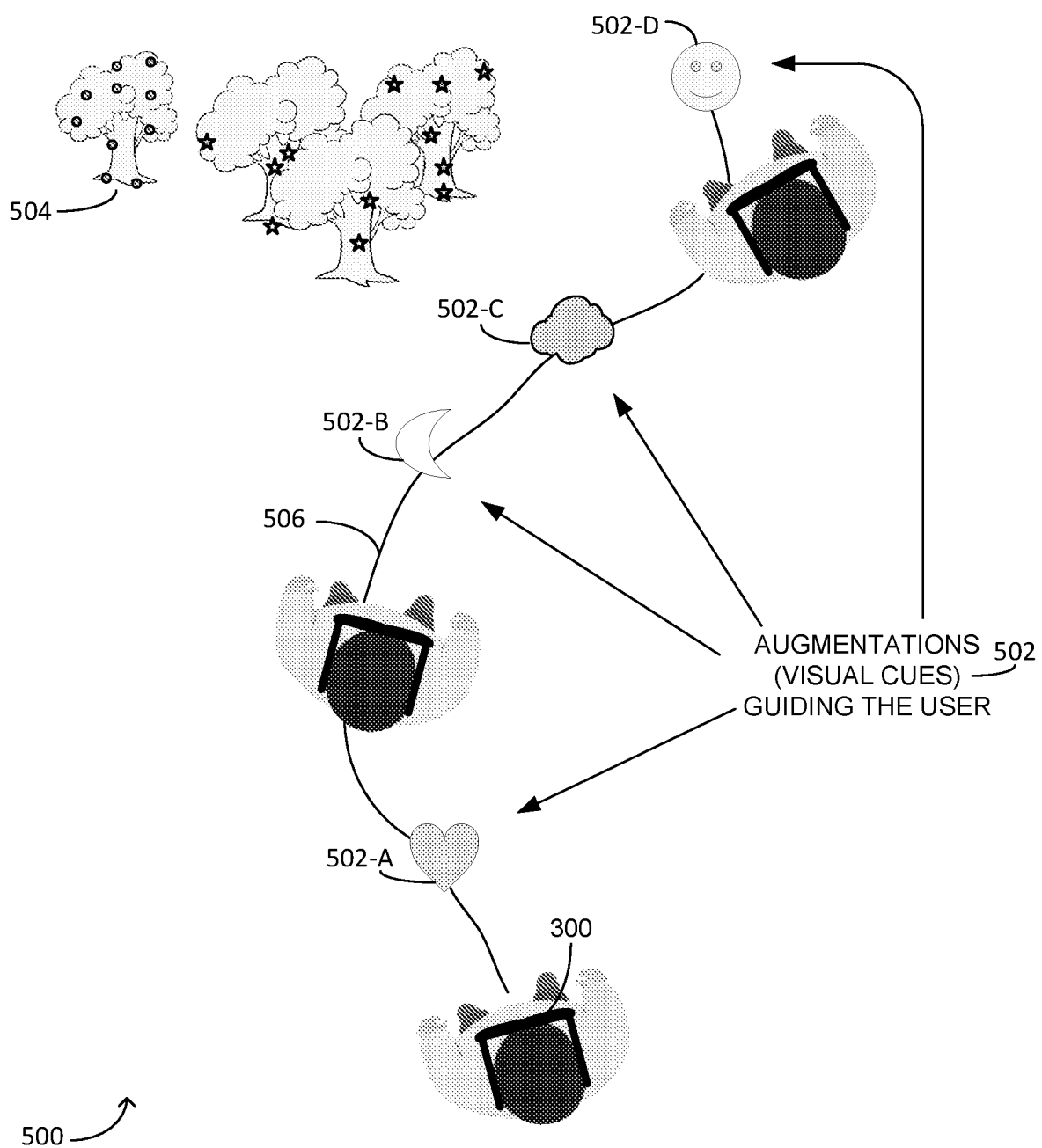
FIG. 5 is a diagram illustrating how a user, wearing AR glasses, may be guided by augmentations or visual cues to traverse an optimal trajectory and to look in optimal directions, during a recalibration operation consistent with some examples.

FIG. 5 is a diagram illustrating how a user, wearing AR glasses 300, may be guided by augmentations 502 or visual cues to traverse an optimal trajectory through a real-world environment 500 and to look in optimal directions, during a recalibration operation consistent with some examples. As shown in FIG. 5, the AR glasses 300 guide the user through an optimal path for recalibration by displaying visual cues 502 in the form of virtual objects overlaid on the real-world environment 500. These objects, such as the heart 502-A, moon 502-B, cloud 502-C and smiley face 502-D, prompt the user to walk towards each object and turn to look in the direction of the next object along the optimal path. By following these visual cues, the user traverses a customized trajectory 506 that allows the AR glasses 300 to capture targeted data for recalibrating specific parameters.

As the user moves through the environment along the optimal path 506, the AR glasses 300 track the motion and orientation of the AR glasses 300 using the ground truth map as a reference. With each movement or turn of the head, new map data is captured through the image sensors and other sensors. This new data is compared to the ground truth map to detect any discrepancies or misalignments. For example, if the user turns to look at the trees 504 by virtue of being prompted to look in the direction of a virtual object 402, if map points associated with various features of the trees appear at different positions or orientations than recorded in the ground truth map, this indicates a potential calibration issue. These discrepancies can then be used to adjust the necessary calibration parameters to correct the alignment.

The process is iterative, with the user continuing along the path 506 guided by the visual cues 502 as the system makes incremental adjustments to the calibration. Once the user has reached the end of the path, the AR glasses may prompt the user to repeat the path to validate the recalibration. If additional discrepancies are detected, further adjustments are made. This cycle can repeat until the new data closely matches the ground truth map, indicating the calibration errors have been resolved.

Figure 6:
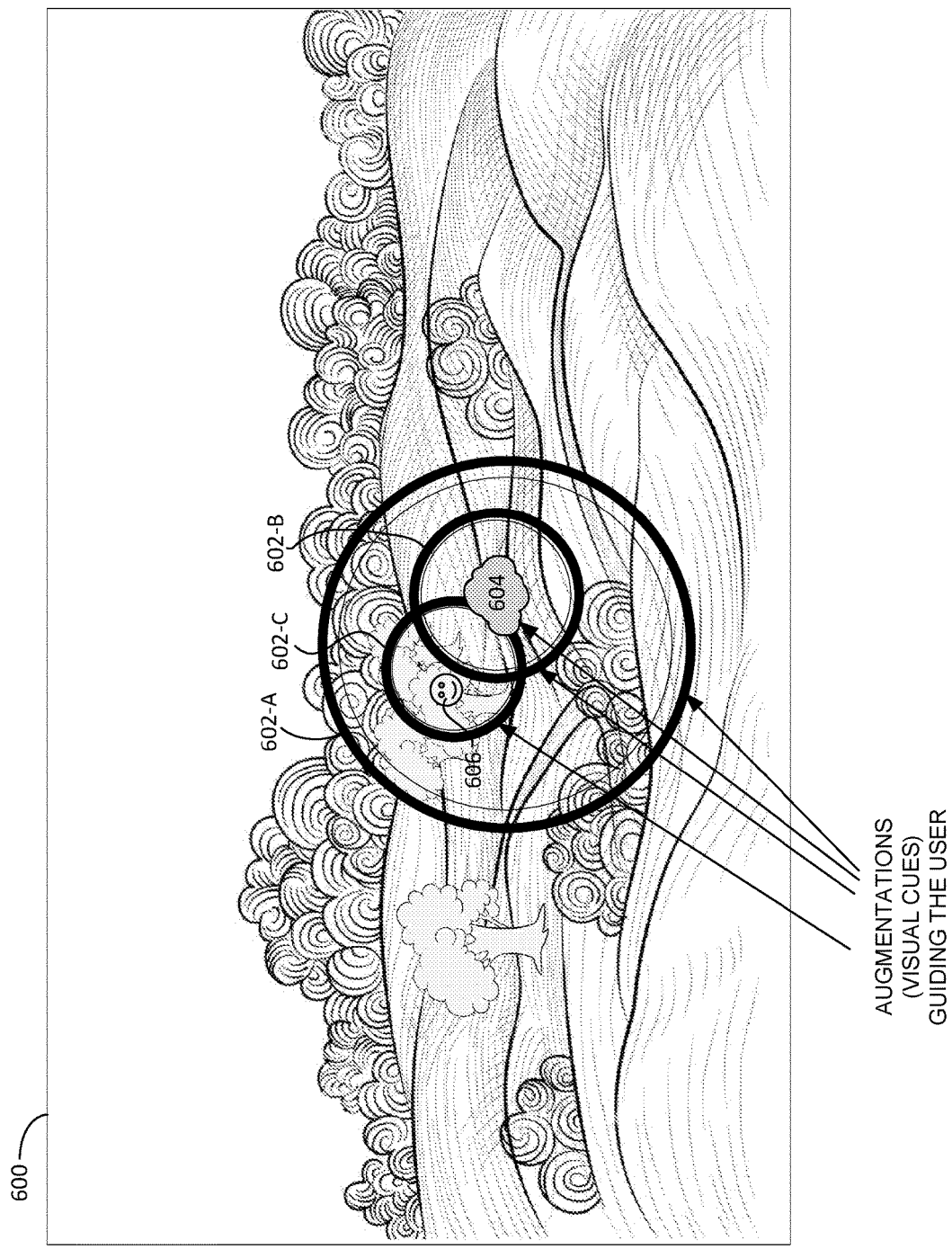
FIG. 6 is a diagram illustrating an AR view as may be presented to a user of AR glasses, where the AR view includes several virtual content items in the form of visual cues or augmentations for guiding the user to move in a trajectory and look in directions that are optimal for observing objects in an environment that is associated with an accurate map (e.g., a ground truth map), according to some embodiments.

FIG. 6 shows an example of the AR view 600 that may be displayed to the user during recalibration of the AR glasses. In the AR view 600, the user sees the real-world environment through the AR glasses as normal. However, overlaid on the environment are virtual visual cues in the form of circles 602-A, 602-B and 602-C, highlighting specific virtual objects, such as the cloud 604 and smiley face 606. These visual cues prompt the user to walk towards the encircled objects and turn to look at them, guiding the user through the optimal path for recalibration. By following the visual cues, the user is able to capture targeted data, represented in the ground truth map, for adjusting the calibration parameters requiring recalibration.

The visual cues overlaid on the AR view 600 provide an intuitive interface for the recalibration process. Rather than providing the user with technical instructions for data capture, the circles intuitively guide the user through the necessary motions and viewing directions. The user simply walks towards the highlighted objects and turns to look where indicated. In some examples, audible navigation cues may be played, for example, through a speaker of the AR glasses, to enhance the guidance presented to the user. In the background, the system is able to track the user's trajectory through the environment and capture new map data from the image sensors and other sensors. This data is compared to the ground truth map to determine discrepancies and make adjustments to the calibration parameters. By presenting visual cues and specific objects in the AR view, the system is able to guide the user to capture data for recalibrating the necessary parameters in an efficient manner with minimal input required. The AR view 600 with overlaid visual cues offers an engaging interface for the recalibration of the AR glasses.

To make the recalibration process more engaging for the user, the AR glasses may present the operation as an interactive game. As the user follows the visual cues and reaches each highlighted object, an animation or visual reward may play to indicate the prompt was followed properly. For example, when the user turns to look at the smiley face object, the smiley face may spin, change color, or become animated. When the user walks to the cloud object, it may release virtual rain or change shape. These animations provide positive feedback, rewarding the user for accurately following the guidance.

The game may also track points or a score as the user progresses through the recalibration path. With each animation triggered, the score increases. Music or sounds may play as the score goes up, creating an exciting and rewarding experience. If the user fails to follow a visual cue or prompt, no animation or points are awarded. The score and any unlocked achievements can be displayed on the AR view to motivate the user. By presenting the recalibration operation as an interactive game, the experience becomes more engaging and fun for the user. The game encourages the user to follow the visual cues and guidance accurately so they can achieve a higher score and unlock more achievements and rewards. This helps ensure the necessary data is captured properly for recalibrating the AR glasses.

In summary, gamifying the recalibration process helps create an engaging user experience. Visual rewards, points, music and sounds can be used to motivate the user to follow the guidance provided by the overlaid visual cues. Failure to follow the cues results in no rewards or points, encouraging the user to accurately capture the data needed for recalibration. By making the experience interactive and game-like, the recalibration operation becomes an entertaining activity rather than a tedious technical process, leading to a better overall experience with the AR glasses. The gamification of the recalibration process is one way to improve user engagement and satisfaction.

In the several examples presented herein, the ground truth map is described as having been captured or created by the AR device on which the recalibration is to occur. In various alternative embodiments, the ground truth map utilized in detecting calibration errors, and in recalibration, does not need to be generated by the AR glasses themselves. Rather than capturing and storing its own ground truth map when calibration is presumed accurate, the AR glasses may obtain reliable ground truth maps or data from other sources. For example, if operating in a location for which highly accurate publicly available maps exist, such as a public park or a famous landmark, the AR glasses can download the public map to use as ground truth. Alternatively, the AR glasses may connect to other trusted user devices, including another AR device, or a shared server and obtain ground truth maps that others have captured when their AR devices were newly calibrated. By crowdsourcing ground truth maps from other calibrated sources, the AR glasses can save the effort of mapping environments themselves before recalibration, and/or perform the recalibration in locations for which the AR glasses had not previously operated, for example, to capture a ground truth map. As long as the acquired ground truth map meets accuracy thresholds, contains sufficient spatial features, and covers the desired environment, it can serve as effective recalibration data even if generated on a different device.

Example Augmented Reality (AR) Device

Figure 7:
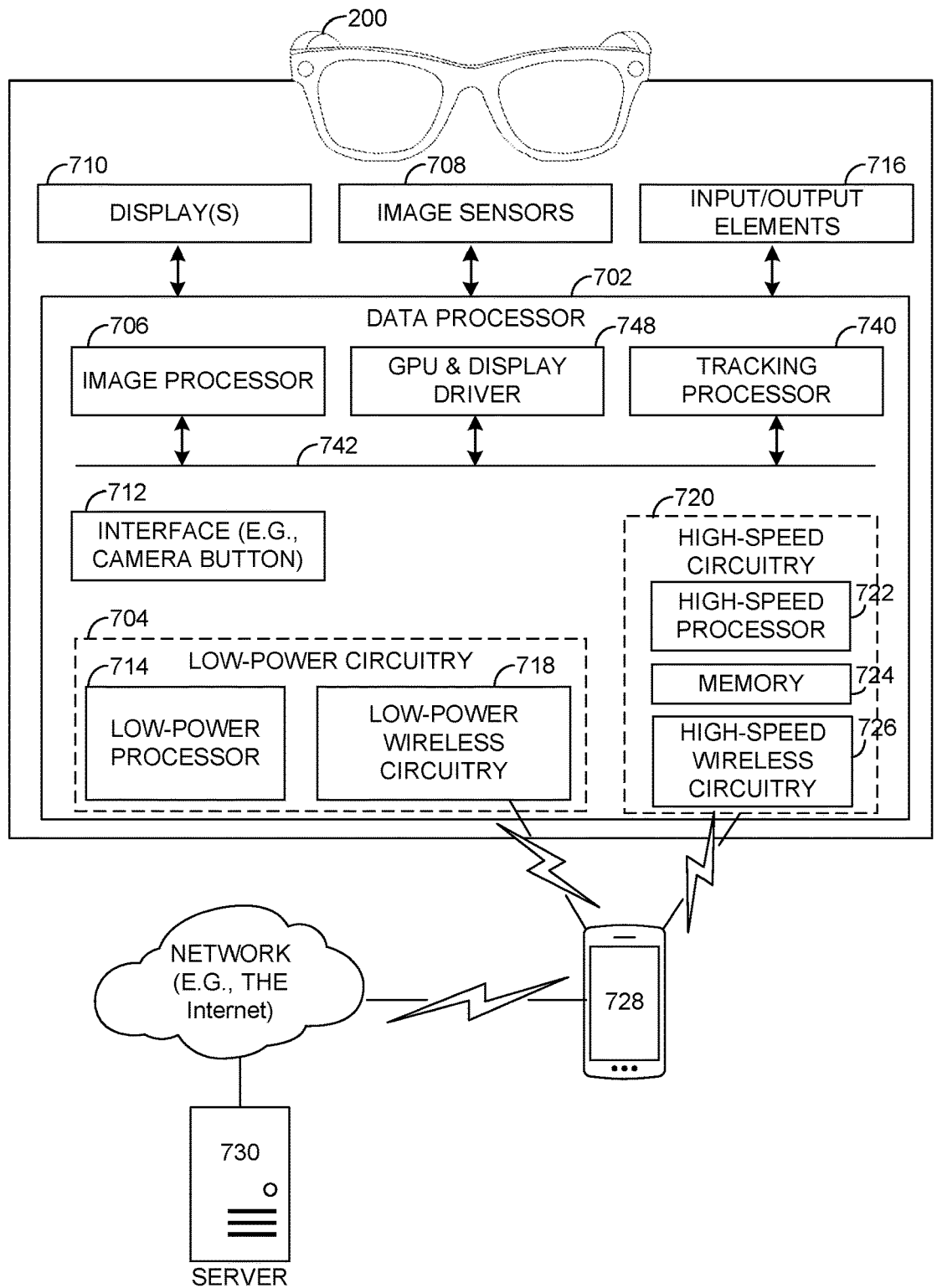
FIG. 7 is a block diagram illustrating an example of the functional components (e.g., hardware components) of an AR device (e.g., AR glasses) with which the methods and techniques described herein, may be implemented, consistent with embodiments of the present invention.

FIG. 7 is a block diagram illustrating an example of the functional components (e.g., hardware components) of an AR device (e.g., AR glasses 200) with which the methods and techniques described herein, may be implemented, consistent with embodiments of the present invention. Those skilled in the art will readily appreciate that the AR glasses 200 depicted in FIG. 7 are but one example of the many different devices to which the inventive subject matter may be applicable. For example, embodiments of the present invention are not limited to AR glasses, but are also applicable to AR headsets, and other wearable virtual reality devices and mixed reality devices.

The AR glasses 200 include a data processor 702, a display 710, two or more image sensors 708, and additional input/output elements 716. The input/output elements 716 may include microphones, audio speakers, biometric sensors, additional sensors, or additional display elements integrated with the data processor 702. For example, the input/output elements 716 may include any of I/O components, including motion components, and so forth.

Consistent with one example, and as described herein, the display 710 includes a first sub-display for the user's left eye and a second sub-display for the user's right eye. Accordingly, although referenced in the singular (a display), the display may, in some examples, comprises two separate displays that operate together. Each display of the AR glasses 200 may include a forward optical assembly (not shown) comprising a right projector and a right near eye display, and a forward optical assembly including a left projector and a left near eye display. In some examples, the near eye displays are waveguides. The waveguides include reflective or diffractive structures (e.g., gratings and/or optical elements such as mirrors, lenses, or prisms). Light emitted by the right projector encounters the diffractive structures of the waveguide of the right near eye display, which directs the light towards the right eye of a user to provide an image on or in the right optical element that overlays the view of the real world seen by the user. Similarly, light emitted by a left projector encounters the diffractive structures of the waveguide of the left near eye display, which directs the light towards the left eye of a user to provide an image on or in the left optical element that overlays the view of the real world seen by the user.

The data processor 702 includes an image processor 706 (e.g., a video processor), a graphics processor unit (GPU) & display driver 748, a tracking processor 740, an interface 712, low-power circuitry 704, and high-speed circuitry 720. The components of the data processor 702 are interconnected by a bus 742.

The interface 712 refers to any source of a user command that is provided to the data processor 702 as input. In one or more examples, the interface 712 is a physical button that, when depressed, sends a user input signal from the interface 712 to a low-power processor 714. A depression of such button followed by an immediate release may be processed by the low-power processor 714 as a request to capture a single image, or vice versa. A depression of such a button for a first period of time may be processed by the low-power processor 714 as a request to capture video data while the button is depressed, and to cease video capture when the button is released, with the video captured while the button was depressed stored as a single video file. Alternatively, depression of a button for an extended period of time may capture a still image. In some examples, the interface 712 may be any mechanical switch or physical interface capable of accepting and detecting user inputs associated with a request for data from the image sensor(s) 708. In other examples, the interface 712 may have a software component, or may be associated with a command received wirelessly from another source, such as from the client device 728.

The image processor 706 includes circuitry to receive signals from the image sensors 708 and process those signals from the image sensors 708 into a format suitable for storage in the memory 724 or for transmission to the client device

728. In one or more examples, the image processor 706 (e.g., video processor) comprises a microprocessor integrated circuit (IC) customized for processing sensor data from the image sensors 708, along with volatile memory used by the microprocessor in operation.

The low-power circuitry 704 includes the low-power processor 714 and the low-power wireless circuitry 718. These elements of the low-power circuitry 704 may be implemented as separate elements or may be implemented on a single IC as part of a system on a single chip. The low-power processor 714 includes logic for managing the other elements of the AR glasses 200. As described above, for example, the low-power processor 714 may accept user input signals from the interface 712. The low-power processor 714 may also be configured to receive input signals or instruction communications from the client device 728 via the low-power wireless connection. The low-power wireless circuitry 718 includes circuit elements for implementing a low-power wireless communication system. Bluetooth™ Smart, also known as Bluetooth™ low energy, is one standard implementation of a low power wireless communication system that may be used to implement the low-power wireless circuitry 718. In other examples, other low power communication systems may be used.

The high-speed circuitry 720 includes a high-speed processor 722, a memory 724, and a high-speed wireless circuitry 726. The high-speed processor 722 may be any processor capable of managing high-speed communications and operation of any general computing system used for the data processor 702. The high-speed processor 722 includes processing resources used for managing high-speed data transfers on the high-speed wireless connection 734 using the high-speed wireless circuitry 726. In some examples, the high-speed processor 722 executes an operating system such as a LINUX operating system or other such operating system. In addition to any other responsibilities, the high-speed processor 722 executing a software architecture for the data processor 702 is used to manage data transfers with the high-speed wireless circuitry 726. In some examples, the high-speed wireless circuitry 726 is configured to implement Institute of Electrical and Electronic Engineers (IEEE) 802.11 communication standards, also referred to herein as Wi-Fi. In other examples, other high-speed communications standards may be implemented by the high-speed wireless circuitry 726.

The memory 724 includes any storage device capable of storing camera data generated by the image sensors 708 and the image processor 706. While the memory 724 is shown as integrated with the high-speed circuitry 720, in other examples, the memory 724 may be an independent stand-alone element of the data processor 402. In some such examples, electrical routing lines may provide a connection through a chip that includes the high-speed processor 722 from image processor 706 or the low-power processor 714 to the memory 724. In other examples, the high-speed processor 722 may manage addressing of the memory 724 such that the low-power processor 714 will boot the high-speed processor 722 any time that a read or write operation involving the memory 724 is desired.

The tracking processor 740 estimates a pose of the AR glasses 200. For example, the tracking processor 740 uses image data and corresponding inertial data from the image sensors 708 and the position components, as well as GPS data, to track a location and determine a pose of the AR glasses 200 relative to a frame of reference (e.g., real-world scene). The tracking module 740 continually gathers and uses updated sensor data describing movements of the AR glasses 200 to determine updated three-dimensional poses of the AR glasses 200 that indicate changes in the relative position and orientation relative to physical objects in the real-world environment. The tracking processor 740 permits visual placement of virtual objects relative to physical objects by the AR glasses 200 within the field of view of the user via the displays 710.

The GPU & display driver 738 may use the pose of the AR glasses 200 to generate frames of virtual content or other content to be presented on the displays 410 when the AR glasses 200 are functioning in a traditional AR mode. In this mode, the GPU & display driver 738 generate updated frames of virtual content based on updated three-dimensional poses of the AR glasses 200, which reflect changes in the position and orientation of the user in relation to physical objects in the user's real-world environment.

One or more functions or operations described herein may also be performed in an application resident on the AR glasses 200 or on the client device 728, or on a remote server 730. Consistent with some examples, the AR glasses 200 may operate in a networked system, which includes the AR glasses 200, the client computing device 728, and a server 730, which may be communicatively coupled via the network. The client device 728 may be a smartphone, tablet, phablet, laptop computer, access point, or any other such device capable of connecting with the AR glasses 200 using a low-power wireless connection and/or a high-speed wireless connection. The client device 728 is connected to the server system 730 via the network. The network may include any combination of wired and wireless connections. The server 730 may be one or more computing devices as part of a service or network computing system.

Software Architecture

Figure 8:
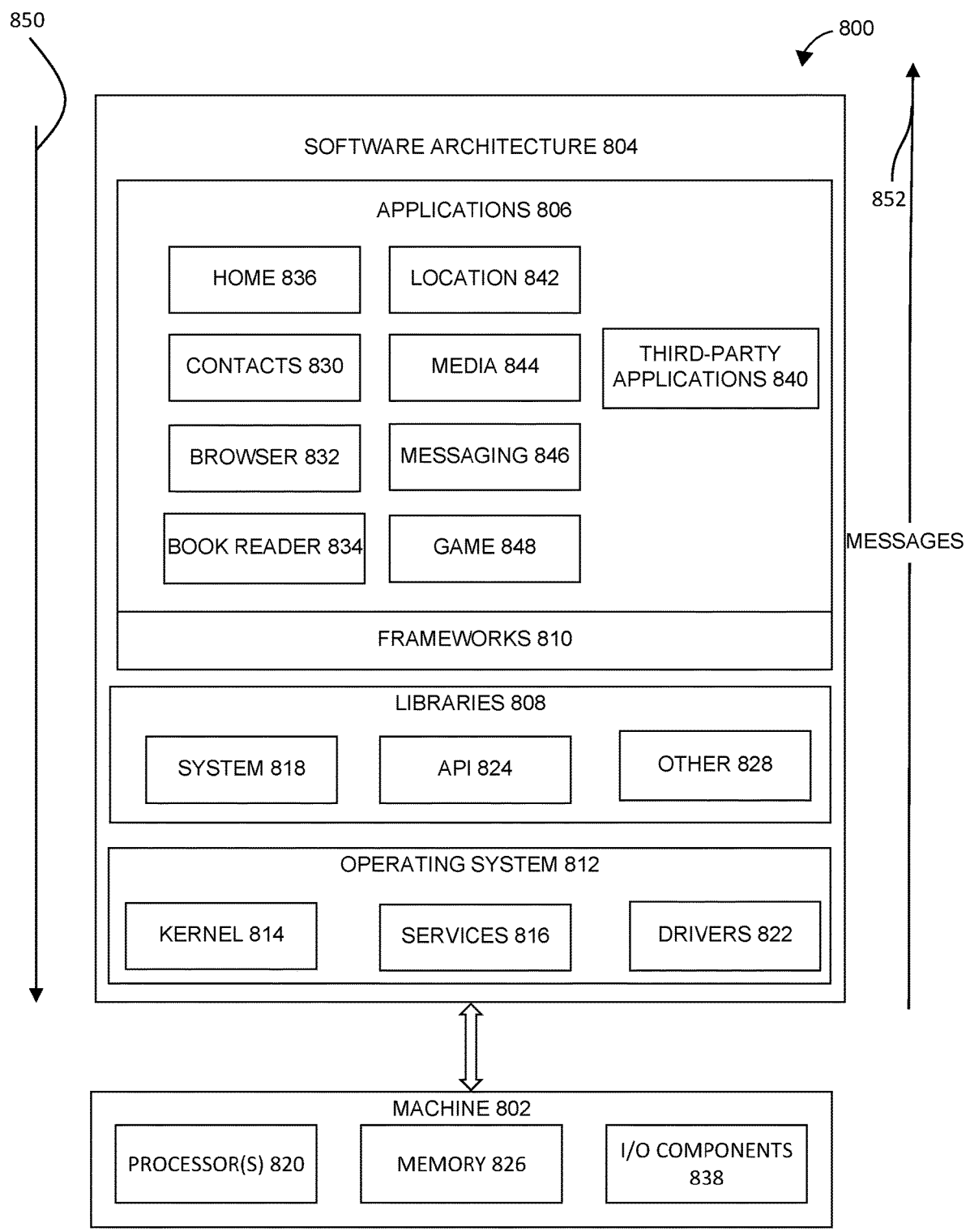
FIG. 8 is a block diagram illustrating a software architecture, which can be installed on any one or more of the devices described herein.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where individual layers provides a particular functionality. The software architecture 804 includes layers such as an operating system 812, libraries 808, frameworks 810, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 522. The kernel 814 acts as an abstraction layer between the hardware and the other software layers. For example, the kernel 814 provides memory management, processor management (e.g., scheduling), component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 808 provide a low-level common infrastructure used by the applications 806. The libraries 808 can include system libraries 818 (e.g., C standard library) that provide functions such as memory allocation functions, string manipulation functions, mathematic functions, and the like. In addition, the libraries 808 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement 3D user interfaces), image feature extraction libraries (e.g. OpenIMAJ), database libraries (e.g., SQLite to provide various relational database functions), web libraries (e.g., WebKit to provide web browsing functionality), and the like. The libraries 808 can also include a wide variety of other libraries 828 to provide many other APIs to the applications 806.

The frameworks 810 provide a high-level common infrastructure that is used by the applications 806. For example, the frameworks 810 provide various graphical user interface (GUI) functions, high-level resource management, and high-level location services. The frameworks 810 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other Applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., Applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 840 can invoke the API calls 850 provided by the operating system 812 to facilitate functionality described herein.

EXAMPLES

Example 1 is an augmented reality (AR) device configured to perform a field-based recalibration procedure, the AR device comprising: a display; a processor; two or more image sensors; an Inertial Measurement Unit (IMU); and a memory storing instructions thereon, which, when executed by the processor, cause the AR device to perform operations comprising: generating map data for a real-world environment by processing images obtained from the image sensors and motion data from the IMU; detecting a possible calibration error by comparing the map data for the real-world environment with ground truth map data for the real-world environment (that was previously generated by the AR device); in response to detecting the possible calibration error, evaluating a rule to determine that a recalibration procedure is to be executed; and executing the recalibration procedure by generating visual cues and displaying the visual cues via the display, the visual cues prompting a user of the AR device to traverse a path in the real-world environment, and to look in specific directions while traversing the path, during the recalibration procedure.

In Example 2, the subject matter of Example 1 includes, wherein the ground truth map data for the real-world environment was previously generated by the AR device operating in the real-world environment.

In Example 3, the subject matter of Examples 1-2 includes, prior to comparing the map data for the real-world environment with ground truth map data for the real-world environment: receiving at the AR device the ground truth map data for the real-world environment as captured by another computing device.

In Example 4, the subject matter of Examples 1-3 includes, wherein the memory is storing further instructions thereon, which, when executed by the processor, cause the AR device to perform additional operations comprising: prior to generating the map data for the real-world environment: determining the AR device is operating in a state with a high likelihood of having an accurate factory calibration; and in response to determining the AR device is operating in the state, i) generating the ground truth map data for the real-world environment, and ii) storing the ground truth map data for the real-world environment.

In Example 5, the subject matter of Examples 1-4 includes, wherein determining the AR device is operating in a state with a high likelihood of having an accurate factory calibration comprises: evaluating a usage log to determine that a duration of time the AR device has been in active use since the AR device was factory calibrated is less than a threshold; evaluating a usage log to determine that a count of times the AR device has been activated since the AR device was factory calibrated is less than a threshold; evaluating a configuration setting to determine that a duration of time since the AR device was first activated is less than a threshold; evaluating a configuration setting to determine that a duration of time that has passed since the AR device was factory calibrated is less than a threshold; or, any combination thereof.

In Example 6, the subject matter of Examples 1-5 includes, wherein evaluating a rule to determine that a recalibration procedure is to be executed comprises: evaluating the rule to determine that a count of times a possible calibration error has been detected exceeds a threshold.

In Example 7, the subject matter of Examples 1-6 includes, wherein detecting a possible calibration error by comparing the map data for the real-world environment with ground truth map data for the real-world environment comprises: determining the depth or position of a feature or object in the map data does not match the depth or position of the feature or object in the ground truth map data; determining the scale or orientation of the map data does not match the scale or orientation of the ground truth map data; or a combination thereof.

In Example 8, the subject matter of Examples 1-7 includes, wherein the visual cues prompting the user of the AR device to traverse the path in the real-world environment, and to look in specific directions while traversing the path, are derived by first determining an optimal path that allows for high observability of one or more parameters to be recalibrated, wherein the one or more parameters to be recalibrated are selected based on a type of possible calibration error that has been detected.

In Example 9, the subject matter of Example 8 includes, wherein executing the recalibration procedure further comprises: during the recalibration procedure and while the user is traversing a path guided by the visual cues displayed via the display of the AR device, iteratively adjusting one or more calibration parameters of the AR device to reduce discrepancies between newly generated map data and the ground truth map data.

In Example 10, the subject matter of Examples 1-9 includes, wherein executing the recalibration procedure further comprises: during the recalibration procedure and while the user is traversing a path guided by the visual cues displayed via the display of the AR device, providing visual feedback to the user via the display in response to determining the user has traversed a path, and looked in various directions while traversing the path, consistent with the displayed visual cues.

Example 11 is a method performed by an augmented reality (AR) device, the method comprising: generating map data for a real-world environment by processing images obtained from image sensors and motion data from an IMU; detecting a possible calibration error by comparing the map data for the real-world environment with ground truth map data for the real-world environment; in response to detecting the possible calibration error, evaluating a rule to determine that a recalibration procedure is to be executed; and executing the recalibration procedure by generating visual cues and displaying the visual cues via a display, the visual cues prompting a user of the AR device to traverse a path in the real-world environment, and to look in specific directions while traversing the path, during the recalibration procedure.

In Example 12, the subject matter of Example 11 includes, wherein the ground truth map data for the real-world environment was previously generated by the AR device operating in the real-world environment.

In Example 13, the subject matter of Examples 11-12 includes, prior to comparing the map data for the real-world environment with ground truth map data for the real-world environment: receiving at the AR device the ground truth map data for the real-world environment as captured by another computing device.

In Example 14, the subject matter of Examples 11-13 includes, prior to generating the map data for the real-world environment: determining the AR device is operating in a state with a high likelihood of having an accurate factory calibration; and in response to determining the AR device is operating in the state, i) generating the ground truth map data for the real-world environment, and ii) storing the ground truth map data for the real-world environment.

In Example 15, the subject matter of Examples 11-14 includes, wherein determining the AR device is operating in a state with a high likelihood of having an accurate factory calibration comprises: evaluating a usage log to determine that a duration of time the AR device has been in active use since the AR device was factory calibrated is less than a threshold; evaluating a usage log to determine that a count of times the AR device has been activated since the AR device was factory calibrated is less than a threshold; evaluating a configuration setting to determine that a duration of time since the AR device was first activated is less than a threshold; evaluating a configuration setting to determine that a duration of time that has passed since the AR device was factory calibrated is less than a threshold; or, any combination thereof.

In Example 16, the subject matter of Examples 11-15 includes, wherein evaluating a rule to determine that a recalibration procedure is to be executed comprises: evaluating the rule to determine that a count of times a possible calibration error has been detected exceeds a threshold.

In Example 17, the subject matter of Examples 11-16 includes, wherein detecting a possible calibration error by comparing the map data for the real-world environment with ground truth map data for the real-world environment comprises: determining the depth or position of a feature or object in the map data does not match the depth or position of the feature or object in the ground truth map data; determining the scale or orientation of the map data does not match the scale or orientation of the ground truth map data; or a combination thereof.

In Example 18, the subject matter of Examples 11-17 includes, wherein the visual cues prompting the user of the AR device to traverse the path in the real-world environment, and to look in specific directions while traversing the path, are derived by first determining an optimal path that allows for high observability of one or more parameters to be recalibrated, wherein the one or more parameters to be recalibrated are selected based on a type of possible calibration error that has been detected.

In Example 19, the subject matter of Example 18 includes, wherein executing the recalibration procedure further comprises: during the recalibration procedure and while the user is traversing a path guided by the visual cues displayed via the display of the AR device, iteratively adjusting one or more calibration parameters of the AR device to reduce discrepancies between newly generated map data and the ground truth map data.

In Example 20, the subject matter of Examples 11-19 includes, wherein executing the recalibration procedure further comprises: during the recalibration procedure and while the user is traversing a path guided by the visual cues displayed via the display of the AR device, providing visual feedback to the user via the display in response to determining the user has traversed a path, and looked in various directions while traversing the path, consistent with the displayed visual cues.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components, also referred to as "computer-implemented." Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. An augmented reality (AR) device configured to perform a field-based recalibration procedure, the AR device comprising:
   a display;
   a processor;
   two or more image sensors;
   an Inertial Measurement Unit (IMU); and
   a memory storing instructions thereon, which, when executed by the processor, cause the AR device to perform operations comprising:
   determining the AR device is operating in a state with a high likelihood of having an accurate factory calibration;
   in response to determining the AR device is operating in the state, i) generating ground truth map data for a real-world environment, and ii) storing the ground truth map data for the real-world environment;
   subsequent to storing the ground truth map data for the real-world environment:
      generating map data for the real-world environment by processing images obtained from the image sensors and motion data from the IMU;
      detecting a possible calibration error by comparing the map data for the real-world environment with the ground truth map data for the real-world environment that was previously generated by the AR device;
      in response to detecting the possible calibration error, evaluating a rule to determine that a recalibration procedure is to be executed; and
      executing the recalibration procedure by generating visual cues and displaying the visual cues via the display, the visual cues prompting a user of the AR device to traverse a path in the real-world environment, and to look in specific directions while traversing the path, during the recalibration procedure.

2. The AR device of claim 1, further comprising:
   prior to comparing the map data for the real-world environment with the ground truth map data for the real-world environment:
   receiving at the AR device additional ground truth map data for the real-world environment as captured by another computing device.

3. The AR device of claim 1, wherein determining the AR device is operating in a state with a high likelihood of having an accurate factory calibration comprises:
   evaluating a usage log to determine that a duration of time the AR device has been in active use since the AR device was factory calibrated is less than a threshold;
   evaluating a usage log to determine that a count of times the AR device has been activated since the AR device was factory calibrated is less than a threshold;
   evaluating a configuration setting to determine that a duration of time since the AR device was first activated is less than a threshold;
   evaluating a configuration setting to determine that a duration of time that has passed since the AR device was factory calibrated is less than a threshold; or,
   any combination thereof.

4. The AR device of claim 1, wherein determining the AR device is operating in a state with a high likelihood of having an accurate factory calibration comprises:
   determining that an event has not occurred, wherein the event is one of:
   detecting an extreme acceleration event exceeding a threshold via the IMU or a dedicated acceleration sensor of the AR device, the extreme acceleration event indicating a physical shock or drop event; or detecting a severed conductive wire incorporated into a frame of the AR device, the severed conductive wire indicating structural deformation exceeding a threshold.

5. The AR device of claim 1, wherein evaluating a rule to determine that a recalibration procedure is to be executed comprises:

evaluating the rule to determine that a count of times a possible calibration error has been detected exceeds a threshold.

6. The AR device of claim 1, wherein detecting a possible calibration error by comparing the map data for the real-world environment with ground truth map data for the real-world environment comprises:

determining the depth or position of a feature or object in the map data does not match the depth or position of the feature or object in the ground truth map data;

determining the scale or orientation of the map data does not match the scale or orientation of the ground truth map data; or a combination thereof.

7. The AR device of claim 1, wherein the visual cues prompting the user of the AR device to traverse the path in the real-world environment, and to look in specific directions while traversing the path, are derived by first determining an optimal path that allows for high observability of one or more parameters to be recalibrated, wherein the one or more parameters to be recalibrated are selected based on a type of possible calibration error that has been detected.

8. The AR device of claim 7, wherein executing the recalibration procedure further comprises:

during the recalibration procedure and while the user is traversing a path guided by the visual cues displayed via the display of the AR device, iteratively adjusting one or more calibration parameters of the AR device to reduce discrepancies between newly generated map data and the ground truth map data.

9. The AR device of claim 1, wherein executing the recalibration procedure further comprises:

during the recalibration procedure and while the user is traversing a path guided by the visual cues displayed via the display of the AR device, providing visual feedback to the user via the display in response to determining the user has traversed a path, and looked in various directions while traversing the path, consistent with the displayed visual cues.

10. A method performed by an augmented reality (AR) device, the method comprising:

determining the AR device is operating in a state with a high likelihood of having an accurate factory calibration;

in response to determining the AR device is operating in the state, i) generating ground truth map data for a real-world environment, and ii) storing the ground truth map data for the real-world environment;

subsequent to storing the ground truth map data for the real-world environment:

generating map data for the real-world environment by processing images obtained from image sensors and motion data from an IMU;

detecting a possible calibration error by comparing the map data for the real-world environment with the ground truth map data for the real-world environment;

in response to detecting the possible calibration error, evaluating a rule to determine that a recalibration procedure is to be executed; and executing the recalibration procedure by generating visual cues and displaying the visual cues via a display, the visual cues prompting a user of the AR device to traverse a path in the real-world environment, and to look in specific directions while traversing the path, during the recalibration procedure.

11. The method of claim 10, further comprising:

prior to comparing the map data for the real-world environment with the ground truth map data for the real-world environment:

receiving at the AR device additional ground truth map data for the real-world environment as captured by another computing device.

12. The method of claim 10, wherein determining the AR device is operating in a state with a high likelihood of having an accurate factory calibration comprises:

evaluating a usage log to determine that a duration of time the AR device has been in active use since the AR device was factory calibrated is less than a threshold;

evaluating a usage log to determine that a count of times the AR device has been activated since the AR device was factory calibrated is less than a threshold;

evaluating a configuration setting to determine that a duration of time since the AR device was first activated is less than a threshold;

evaluating a configuration setting to determine that a duration of time that has passed since the AR device was factory calibrated is less than a threshold; or any combination thereof.

13. The method of claim 10, wherein determining the AR device is operating in a state with a high likelihood of having an accurate factory calibration comprises:

determining that an event has not occurred, wherein the event is one of:

detecting an extreme acceleration event exceeding a threshold via an inertial measurement unit or dedicated acceleration sensor of the AR device, the extreme acceleration event indicating a physical shock or drop event; or detecting a severed conductive wire incorporated into a frame of the AR device, the severed conductive wire indicating structural deformation exceeding a threshold.

14. The method of claim 10, wherein evaluating a rule to determine that a recalibration procedure is to be executed comprises:

evaluating the rule to determine that a count of times a possible calibration error has been detected exceeds a threshold.

15. The method of claim 10, wherein detecting a possible calibration error by comparing the map data for the real-world environment with ground truth map data for the real-world environment comprises:

determining the depth or position of a feature or object in the map data does not match the depth or position of the feature or object in the ground truth map data;

determining the scale or orientation of the map data does not match the scale or orientation of the ground truth map data; or a combination thereof.

16. The method of claim 10, wherein the visual cues prompting the user of the AR device to traverse the path in the real-world environment, and to look in specific directions while traversing the path, are derived by first determining an optimal path that allows for high observability of one or more parameters to be recalibrated, wherein the one or more parameters to be recalibrated are selected based on a type of possible calibration error that has been detected.

17. The method of claim 16, wherein executing the recalibration procedure further comprises:
   during the recalibration procedure and while the user is traversing a path guided by the visual cues displayed via the display of the AR device, iteratively adjusting one or more calibration parameters of the AR device to reduce discrepancies between newly generated map data and the ground truth map data.

18. The method of claim 10, wherein executing the recalibration procedure further comprises:
   during the recalibration procedure and while the user is traversing a path guided by the visual cues displayed via the display of the AR device, providing visual feedback to the user via the display in response to determining the user has traversed a path, and looked in various directions while traversing the path, consistent with the displayed visual cues.

\* \* \* \* \*